United States Patent
Mwanje et al.

(10) Patent No.: US 12,267,218 B2
(45) Date of Patent: Apr. 1, 2025

(54) APPARATUS, METHODS, AND COMPUTER PROGRAMS

(71) Applicant: Nokia Technologies Oy, Espoo (FI)

(72) Inventors: Stephen Mwanje, Munich (DE); Joao Antonio Pereira Rodrigues, Amadora (PT)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/557,677

(22) PCT Filed: Jun. 15, 2021

(86) PCT No.: PCT/EP2021/066128
§ 371 (c)(1),
(2) Date: Oct. 27, 2023

(87) PCT Pub. No.: WO2022/262958
PCT Pub. Date: Dec. 22, 2022

(65) Prior Publication Data
US 2024/0223469 A1 Jul. 4, 2024

(51) Int. Cl.
*H04L 41/5006* (2022.01)

(52) U.S. Cl.
CPC ................ *H04L 41/5006* (2013.01)

(58) Field of Classification Search
None
See application file for complete search history.

(56) References Cited

U.S. PATENT DOCUMENTS

| 2018/0132138 A1 | 5/2018 | Senarath et al. |
| 2019/0174322 A1 | 6/2019 | Deviprasad et al. |
| 2020/0076709 A1* | 3/2020 | Stenberg ............. H04L 67/1008 |

FOREIGN PATENT DOCUMENTS

EP 4084523 A1 11/2022

OTHER PUBLICATIONS

Zero-touch network and Service Management (ZSM); Cross-domain E2E service lifecycle management, ETSI GS ZSM 008, V1.1.1, Jul. 2022, pp. 1-105.

(Continued)

*Primary Examiner* — June Sison
(74) *Attorney, Agent, or Firm* — SQUIRE PATTON BOGGS (US) LLP

(57) ABSTRACT

An apparatus comprising means configured to: receive a set of service offer descriptors, the service offer descriptor set defining one or more attributes, at least one of the attributes being associated with a plurality of different options, the set of service offer descriptors being associated with a service provider; receive a set of service requirements for a service to be provided, said set of service requirements defining one or more attributes for the service and for one or more of the attributes an associated option; and provide a set of service order descriptors for the service to be provided, said set of service order descriptors based on said set of service offer descriptors and comprising for at least one attribute of the set of service offer descriptors information indicating a selected option of the plurality of different options, in dependence on the service to be provided.

12 Claims, 14 Drawing Sheets

(56) References Cited

OTHER PUBLICATIONS

"3rd Generation Partnership Project; Technical Specification Group Services and System Aspects; Management and orchestration; Architecture framework (Release 16)", 3GPP TS 28.533, V16.7.0, Mar. 2021, pp. 1-30.

"3rd Generation Partnership Project; Technical Specification Group Services and System Aspects; Management and orchestration; Provisioning; (Release 16)", 3GPP TS 28.531, V16.9.0, Mar. 2021, 73 pages.

"Service Ordering Management API User Guide", TM Forum Specification, TMF641, Version 4.1.0, 2020, pp. 1-66.

International Search Report and Written Opinion received for corresponding Patent Cooperation Treaty Application No. PCT/EP2021/066128, dated Feb. 16, 2022, 14 pages.

Tranoris, "Openslice: An opensource OSS for Delivering Network Slice as a Service", Feb. 5, 2021, 13 pages.

\* cited by examiner

| Service Offer Descriptor | | | | | | |
|---|---|---|---|---|---|---|
| Feature | Units | Value Ranges | | | | |
| End-to-end latency | ms | 50 | 25 | 10 | 5 | 1 |
| Jitter | ms | 20 | 10 | 5 | 2 | 1 |
| Survival Time | ms | 2 | 5 | 10 | 25 | 50 |
| Availability | | 99% | 99.5%. | 99.9% | 99.995% | 99.999% |
| Reliability | | 99.5%. | 99.9% | 99.995% | 99.999% | 99.9999% |
| End-user Data rate | ≥ x Mbps | 0.1 | 0.2 | 0.5 | 1.0 | 2.0 |
| Payload | ≈. x Bytes | 1 | 2 | 5 | 10 | 20 |
| Traffic density | Gbps/km$^2$ | 0.1 | 0.5 | 1 | 5 | 10 |
| Connection density | '000/km$^2$ | 100 | 500 | 1000 | 2000 | 5000 |
| Service area size | A x B km | 0.1x10 | 0.1 x 0.1 | 1x1 | 10 x10 | 50 x50 |
| Policies | Pricing policy | Base Price | Base + 0.1% per feature | Base + 0.2% per feature | Base + 0.5% per feature | Base + 1% per feature |
| | Policy 2 | Policy 2 value 1 | Policy 2 value 2 | Policy 2 value 3 | Policy 2 value 4 | Policy 2 value 5 |
| | .. | .. | .. | .. | .. | .. |

Fig.8

| Service Order Descriptor | | | | | | |
|---|---|---|---|---|---|---|
| | | | Value Ranges | | | |
| Feature | Units | | | | | |
| End-to-end latency | ms | 5 | 2 | 1 | 0.5 | 0.1 |
| Jitter | ms | 5 | 2 | 1 | 0.5 | 0.1 |
| Survival Time | ms | 2 | 5 | 10 | 25 | 50 |
| Availability | | 99% | 99.5%. | 99.9% | 99.995% | 99.999% |
| Reliability | | 99% | 99.5%. | 99.9% | 99.995% | 99.999% |
| End-user Data rate | ≥ x Mbps | 0.1 | 0.2 | 0.5 | 1.0 | 2.0 |
| Payload | ≈ x Bytes | 10 | 20 | 50 | 100 | 200 |
| Traffic density | Gbps/km² | 0.1 | 0.5 | 1 | 5 | 10 |
| Connection density | '000/km² | 1 | 5 | 10 | 20 | 50 |
| Service area size | A x B km | 0.1 x 0.1 | 0.1x10 | 1x1 | 10 x10 | 50 x50 |
| Policies | Pricing policy | Base Price | Base + 0.1% per feature | Base + 0.5% per feature | Base + 1% per feature | Base + 2% per feature |
| | Policy 2 | Policy 2 value 1 | Policy 2 value 2 | Policy 2 value 3 | Policy 2 value 4 | Policy 2 value 5 |
| | .. | .. | .. | .. | .. | .. |

Fig.9

| Service consumer requirements | | |
|---|---|---|
| Feature | Units | Value |
| End-to-end latency | ms | < 100 |
| Jitter | ms | < 50 |
| Availability | | > 99.5% |
| Reliability | | > 99.0% |
| End-user Data rate | ≥ x Mbps | 0.2 - 1.0 |
| Service area size | A x B km | 1.0 x 1.0 |
| Policies | Handover | Not needed |
| | .. | .. |
| | .. | .. |

Fig. 10

| Service Order Descriptor | | |
|---|---|---|
| Feature | Units | Value |
| End-to-end latency | ms | 50 |
| Jitter | ms | 20 |
| Survival Time | ms | 2 |
| Availability | | 99% |
| Reliability | | 99.5%. |
| End-user Data rate | ≥ x Mbps | 0.1 |
| Payload | ≈ x Bytes | 1 |
| Traffic density | Gbps/km$^2$ | 0.1 |
| Connection density | '000/km$^2$ | 5000 |
| Service area size | A x B km | 1 x1 |
| Policies | Pricing policy | Base Price+ increments |
| | Policy 2 | Policy 2 selected value |
| | .. | .. |

Fig. 11

| Service Order Descriptor | | |
|---|---|---|
| Feature | Units | Value |
| End-to-end latency | ms | 0.5 |
| Jitter | ms | 0.5 |
| Survival Time | ms | 10 |
| Availability | | 99.9% |
| Reliability | | 99.9% |
| End-user Data rate | ≥ x Mbps | 0.2 |
| Payload | ≈ x Bytes | 20 |
| Traffic density | Gbps/km² | 0.5 |
| Connection density | '000/km² | 5 |
| Service area size | A x B km | 0.1x10 |
| Policies | Pricing policy | Base Price+ increments |
| | Policy 2 | Policy 2 selected value |
| | ⋮ | ⋮ |

Fig.12

APPARATUS, METHODS, AND COMPUTER PROGRAMS

RELATED APPLICATION

This application claims priority to PCT Application No. PCT/EP2021/066128, filed on Jun. 15, 2021, which is incorporated herein by reference in its entirety.

FIELD OF THE DISCLOSURE

The present disclosure relates to apparatus, methods, and computer programs and in particular, but not exclusively apparatus, methods, and computer programs for determining service descriptors for a service.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. One examples of a so-called standard is the so-called 5G standard.

SUMMARY

According to an aspect, there is provided an apparatus comprising means configured to: receive a set of service offer descriptors, the service offer descriptor set defining one or more attributes, at least one of the attributes being associated with a plurality of different options, the set of service offer descriptors being associated with a service provider; receive a set of service requirements for a service to be provided, said set of service requirements defining one or more attributes for the service and for one or more of the attributes an associated option; and provide a set of service order descriptors for the service to be provided, said set of service order descriptors based on said set of service offer descriptors and comprising for at least one attribute of the set of service offer descriptors information indicating a selected option of the plurality of different options, in dependence on the service to be provided.

The means may be further configured to receive a plurality of sets of service offer descriptors, each set of service offer descriptors being associated with a service provider and determine which one of the plurality of sets of service offer descriptors is selected in dependence on the received set of service requirements.

The one or more attributes of the set of service offer descriptors may define one or more quality of service attributes for a service provided by the respective service provider The means may further be configured to select for each attribute of the selected set of service offer descriptors which is associated with a plurality of different options, one of said options, the selected option being dependent on the received set of service requirements to provide the set of service order descriptors.

The means may further be configured to cause a request, for the service to be provided, to be sent to the service provider associated with the set of service offer descriptors.

The request may comprise information relating to the set of service order descriptors.

The means may further be configured to iterate over each a plurality of different configurations provided by different options associated with respective attributes of a respective set of service offer descriptors when determining the selected set of service offer descriptors.

The set of service requirements may define for one or more attributes an acceptable level or value. This may be a minimum or a maximum value depending on the attribute.

The set of service requirements may comprise information indicating a relative importance of one or more of the attributes.

At least two of the sets of service offer descriptors may be associated with different service providers.

The apparatus may be provided by or in a service operating platform entity.

According to another aspect, there is provided an apparatus comprising circuitry configured to: receive a set of service offer descriptors, the service offer descriptor set defining one or more attributes, at least one of the attributes being associated with a plurality of different options, the set of service offer descriptors being associated with a service provider; receive a set of service requirements for a service to be provided, said set of service requirements defining one or more attributes for the service and for one or more of the attributes an associated option; and provide a set of service order descriptors for the service to be provided, said set of service order descriptors based on said set of service offer descriptors and comprising for at least one attribute of the set of service offer descriptors information indicating a selected option of the plurality of different options, in dependence on the service to be provided.

The circuitry may be further configured to receive a plurality of sets of service offer descriptors, each set of service offer descriptors being associated with a service provider and determine which one of the plurality of sets of service offer descriptors is selected in dependence on the received set of service requirements.

The one or more attributes of the set of service offer descriptors may define one or more quality of service attributes for a service provided by the respective service provider The circuitry may be configured to select for each attribute of the selected set of service offer descriptors which is associated with a plurality of different options, one of said options, the selected option being dependent on the received set of service requirements to provide the set of service order descriptors.

The circuitry may be configured to cause a request, for the service to be provided, to be sent to the service provider associated with the set of service offer descriptors.

The request may comprise information relating to the set of the service order descriptors.

The circuitry may be configured to iterate over each a plurality of different configurations provided by different options associated with respective attributes of a respective set of service offer descriptors when determining the selected set of service offer descriptors.

The set of service requirements may define for one or more attributes an acceptable level or value. This may be a minimum or a maximum value depending on the attribute.

The set of service requirements may comprise information indicating a relative importance of one or more of the attributes.

At least two of the sets of service offer descriptors may be associated with different service providers.

The apparatus may be provided by or in a service operating platform entity.

According to an aspect there is provided an apparatus comprising at least one processor and at least one memory including computer code for one or more programs, the at least one memory and the computer code configured, with the at least one processor, to cause the apparatus at least to: receive a set of service offer descriptors, the service offer descriptor set defining one or more attributes, at least one of the attributes being associated with a plurality of different options, the set of service offer descriptors being associated with a service provider; receive a set of service requirements for a service to be provided, said set of service requirements defining one or more attributes for the service and for one or more of the attributes an associated option; and provide a set of service order descriptors for the service to be provided, said set of service order descriptors based on said set of service offer descriptors and comprising for at least one attribute of the set of service offer descriptors information indicating a selected option of the plurality of different options, in dependence on the service to be provided.

The at least one memory and the computer code may be configured, with the at least one processor, to cause the apparatus at least to: receive a plurality of sets of service offer descriptors, each set of service offer descriptors being associated with a service provider; and determine which one of the plurality of sets of service offer descriptors is selected in dependence on the received set of service requirements.

The one or more attributes of the set of service offer descriptors may define one or more quality of service attributes for a service provided by the respective service provider The at least one memory and the computer code may be configured, with the at least one processor, to cause the apparatus at least to: select for each attribute of the selected set of service offer descriptors which is associated with a plurality of different options, one of said options, the selected option being dependent on the received set of service requirements to provide the set of service order descriptors.

The at least one memory and the computer code may be configured, with the at least one processor, to cause the apparatus at least to: cause a request, for the service to be provided, to be sent to the service provider associated with the set of service offer descriptors.

The request may comprise information relating to the set of service order descriptors.

The at least one memory and the computer code may be configured, with the at least one processor, to cause the apparatus at least to: iterate over each a plurality of different configurations provided by different options associated with respective attributes of a respective set of service offer descriptors when determining the selected set of service offer descriptors.

The set of service requirements may define for one or more attributes an acceptable level or value. This may be a minimum or a maximum value depending on the attribute.

The set of service requirements may comprise information indicating a relative importance of one or more of the attributes.

At least two of the sets of service offer descriptors may be associated with different service providers.

The apparatus may be provided by or in a service operating platform entity.

According to an aspect, there is provided a method comprising: receiving a set of service offer descriptors, the service offer descriptor set defining one or more attributes, at least one of the attributes being associated with a plurality of different options, the set of service offer descriptors being associated with a service provider; receiving a set of service requirements for a service to be provided, said set of service requirements defining one or more attributes for the service and for one or more of the attributes an associated option; and providing a set of service order descriptors for the service to be provided, said set of service order descriptors based on said set of service offer descriptors and comprising for at least one attribute of the set of service offer descriptors information indicating a selected option of the plurality of different options, in dependence on the service to be provided.

The method may comprise receiving a plurality of sets of service offer descriptors, each set of service offer descriptors being associated with a service provider and determining which one of the plurality of sets of service offer descriptors is selected in dependence on the received set of service requirements.

The one or more attributes of the set of service offer descriptors may define one or more quality of service attributes for a service provided by the respective service provider The method may comprise selecting for each attribute of the selected set of service offer descriptors which is associated with a plurality of different options, one of said options, the selected option being dependent on the received set of service requirements to provide the set of service order descriptors.

The method may comprise causing a request, for the service to be provided, to be sent to the service provider associated with the selected the set of service offer descriptors.

The request may comprise information relating to the set of service order descriptors.

The method may comprise iterating over each a plurality of different configurations provided by different options associated with respective attributes of a respective set of service offer descriptors when determining the selected set of service offer descriptors.

The set of service requirements may define for one or more attributes an acceptable level or value. This may be a minimum or a maximum value depending on the attribute.

The set of service requirements may comprise information indicating a relative importance of one or more of the attributes.

At least two of the sets of service offer descriptors may be associated with different service providers.

The method may be performed by an apparatus. The apparatus may be provided by or in a service operating platform entity.

According to another aspect, there is provided an apparatus comprising means configured to: provide a set of service offer descriptors, the service offer descriptor set defining one or more attributes, at least one of the attributes being associated with a plurality of different options, the set of service offer descriptors being associated with a service provider; and receive a set of service order descriptors for a service to be provided, said set of service order descriptors based on said set of service offer descriptors and comprising for at least one attribute of the set of service offer descriptors information indicating a selected option of the plurality of different options, in dependence the service to be provided.

The one or more attributes of the set of service offer descriptors may define one or more quality of service attributes for a service provided by the service provider The means may further be configured to cause the service to be instantiated in accordance with the set of service order descriptors.

The apparatus may be provided by or in a service management domain entity.

According to another aspect, there is provided an apparatus comprising circuitry configured to: provide a set of service offer descriptors, the service offer descriptor set defining one or more attributes, at least one of the attributes being associated with a plurality of different options, the set of service offer descriptors being associated with a service provider; and receive a set of service order descriptors for a service to be provided, said set of service order descriptors based on said set of service offer descriptors and comprising for at least one attribute of the set of service offer descriptors information indicating a selected option of the plurality of different options, in dependence the service to be provided.

The one or more attributes of the set of service offer descriptors may define one or more quality of service attributes for a service provided by the service provider The circuitry may be configured to cause the service to be instantiated in accordance with the set of service order descriptors.

The apparatus may be provided by or in a service management domain entity.

According to another aspect, there is provided an apparatus comprising at least one processor and at least one memory including computer code for one or more programs, the at least one memory and the computer code configured, with the at least one processor, to cause the apparatus at least to: provide a set of service offer descriptors, the service offer descriptor set defining one or more attributes, at least one of the attributes being associated with a plurality of different options, the set of service offer descriptors being associated with a service provider; and receive a set of service order descriptors for a service to be provided, said set of service order descriptors based on said set of service offer descriptors and comprising for at least one attribute of the set of service offer descriptors information indicating a selected option of the plurality of different options, in dependence the service to be provided.

The one or more attributes of the set of service offer descriptors may define one or more quality of service attributes for a service provided by the service provider The at least one memory and the computer code may be configured, with the at least one processor, to cause the apparatus at least to: cause the service to be instantiated in accordance with the set of service order descriptors.

The apparatus may be provided by or in a service management domain entity.

According to another aspect, there is provided a method comprising: providing a set of service offer descriptors, the service offer descriptor set defining one or more attributes, at least one of the attributes being associated with a plurality of different options, the set of service offer descriptors being associated with a service provider; and receiving a set of service order descriptors for a service to be provided, said set of service order descriptors based on said set of service offer descriptors and comprising for at least one attribute of the set of service offer descriptors information indicating a selected option of the plurality of different options, in dependence the service to be provided.

The one or more attributes of the set of service offer descriptors may define one or more quality of service attributes for a service provided by the service provider The method may comprise causing the service to be instantiated in accordance with the set of service order descriptors.

The method may be performed by an apparatus. The apparatus may be provided by or in a service management domain entity.

According to an aspect, there is provided an apparatus comprising means configured to: receive a plurality of sets of service offer descriptors, each service offer descriptor set defining one or more attributes, at least one of the attributes being associated with a plurality of different options, each set of service offer descriptors being associated with a service provider; receive a set of service requirements for a service to be provided, said set of service requirements defining one or more attributes for the service and for one or more of the attributes an associated option; and determine which one of the plurality of sets of service offer descriptors is selected in dependence on the received set of service requirements.

According to an aspect, there is provided a computer program comprising computer executable instructions which when run on a at least one processor cause the any one of the above methods to be performed According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 8 shows a table of an example of a set of service offer descriptors.

FIG. 9 shows a table of another example of a set of service offer descriptors FIG. 10 shows a table of an example of service consumer requirements.

FIG. 11 shows a table of an example of a set of service order descriptors.

FIG. 12 shows a table of another example of a set of service order descriptors.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, are briefly explained with reference to FIGS. 1 and 2 to assist in understanding the technology underlying the described examples.

Figure 1:
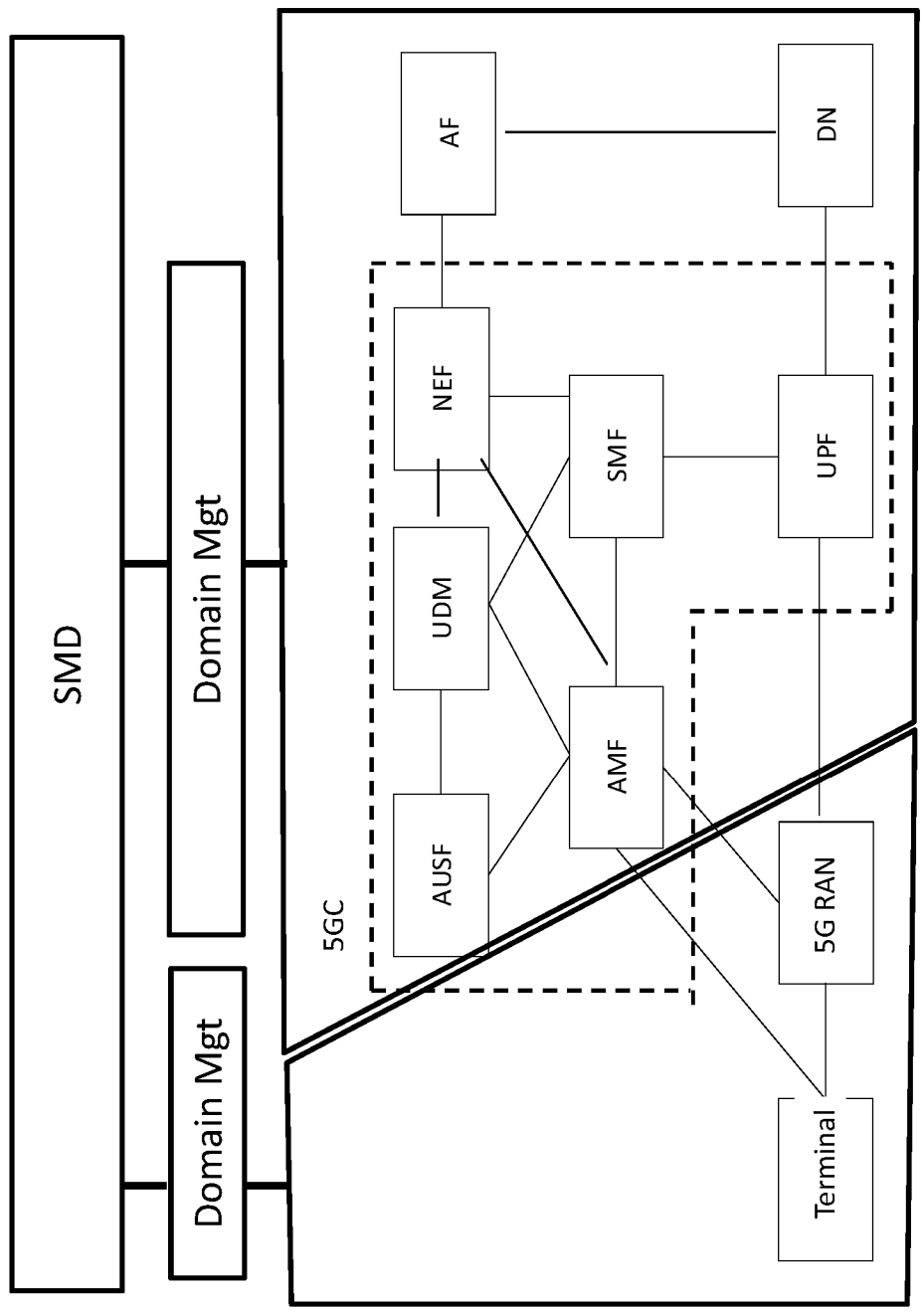
FIG. 1 shows a schematic diagram of an example 5G system with an end-to-end service management domain.

FIG. 1 shows a schematic representation of a 5G system (5GS) with an end-to-end service management domain (SMD). The 5GS may be comprised by a terminal or user equipment (UE), a 5G radio access network (5GRAN) or next generation radio access network (NG-RAN), a 5G core network (5GC), one or more application functions (AF) and one or more data networks (DN).

The 5G-RAN may comprise one or more base stations. In 5G the base station may be referred to as a gNodeB (gNB). The RAN may comprise one or more gNodeB (gNB) (or base station) distributed unit functions connected to one or more gNodeB (gNB) (or base station) centralized unit functions.

The 5GC may comprise the following entities: one or more access management functions (AMF), one or more session management functions (SMF), an authentication server function (AUSF), a unified data management (UDM), one or more user plane functions (UPF), and/or a network exposure function (NEF).

Figure 2:
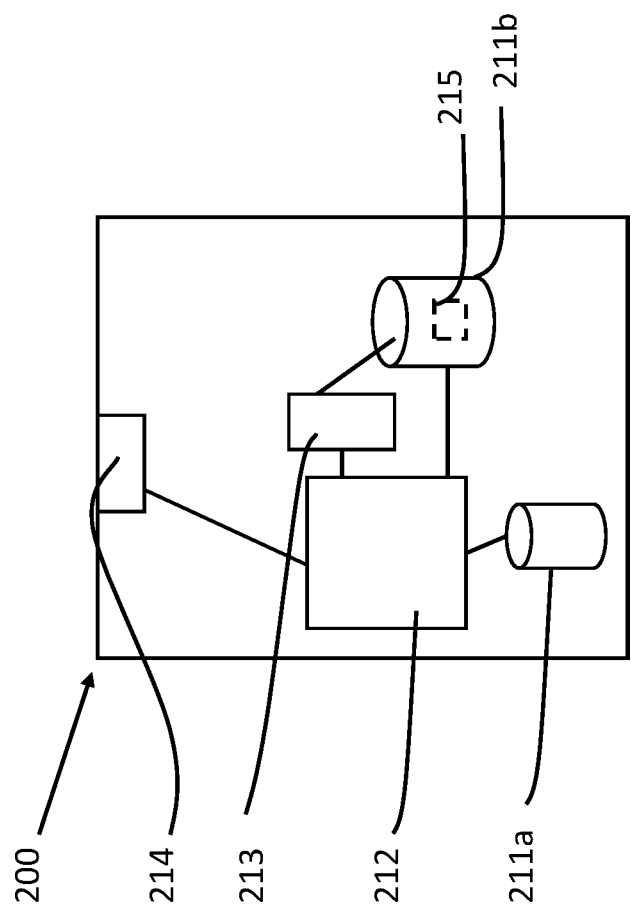
FIG. 2 shows a schematic diagram of an example apparatus.

FIG. 2 illustrates an example of an apparatus 200. This apparatus may be provided for example in a SOP (service order platform) entity or a SMD entity. The apparatus may comprise at least one memory. By way of example only the at least one memory may comprise random access memory (RAM) 211*a* and at least on read only memory (ROM) 211*b*. Apparatus used by other embodiments may comprise different memory.

The apparatus may comprise at least one processor 212, 213. In this example apparatus, two processors are show.

The apparatus may comprise an input/output interface 214.

The at least one processor may be coupled to the at least one memory. The at least one processor may be configured to execute an appropriate software code 215. The software code 215 may for example allow the method of some embodiments to be performed.

The software code 215 may be stored in the at least one memory, for example ROM 211*b*.

The fifth generation of mobile networks (5G) covers a wide variety of use cases, such as the internet of things (IOT) and the industry of the future (Industry 4.0) requiring massive machine type Communication (mMTC). Furthermore, highly safety and security critical use cases like autonomous driving and vehicular communication, including e.g. unmanned aerial vehicle (UAV) control require ultra-reliable and low latency communication (URLLC). Enhanced mobile broadband (eMBB) applications like HD video streaming and augmented reality are also supported. These diverse use cases enforce different requirements on mobile networks.

Different services may thus be supported. One way to support services is using network slicing. However it should be appreciated that network slicing is only one way in which services can be supported.

Network slicing is used in 5G mobile networks to make the networks flexible enough to support those divergent requirements. Network slicing supports different services using the same underlying mobile network infrastructure. Network slices can differ in their service requirements. For example the service requirements may be an ultra-reliable low latency communication (URLLC) service requirements for an enhanced mobile broadband (eMBB) service requirement. Network slices can differ in the tenant that provides those services.

A network slice instance (NSI) is an isolated end-to-end logical network containing all required physical and virtualized resources and network functions to fulfil specific service requirements, for example based on service level agreements (SLAs). Several NSIs may share the same physical and virtualized infrastructure. A network slice instance may be composed of several network slice subnet instances (NSSI).

The lifecycle management of communication services involves multiple management processes that rely on the interaction between an end-to-end service management domain (SMD) and the different technology domains (sometimes referred to as management domains) that work together to fulfil the communication services. This may for example be as specified by the ETSI ZSM framework. For example, this may be ETSI GS ZSM 008: "Zero-touch network and Service Management (ZSM); Cross-domain E2E Service Lifecycle Management". The current version is V0.5.0 (2021-01). As can be seen from FIG. 1, the SMD sits above various domains. The 5G system may be regarded as being made up a "radio domain" and a "core network" domain. Each domain may be associated with a domain management function which sits between the respective domain and the SMD. It should be noted that there may be one or more additional domains provided in some embodiments.

5G mobile networks may support a variety of use cases that might have very diverse and dynamically changing requirements related to, for instance, throughput, latency, availability, and reliability. The 5G mobile networks may be required to support fast mobile communication service roll out and deployment times.

Figure 3:
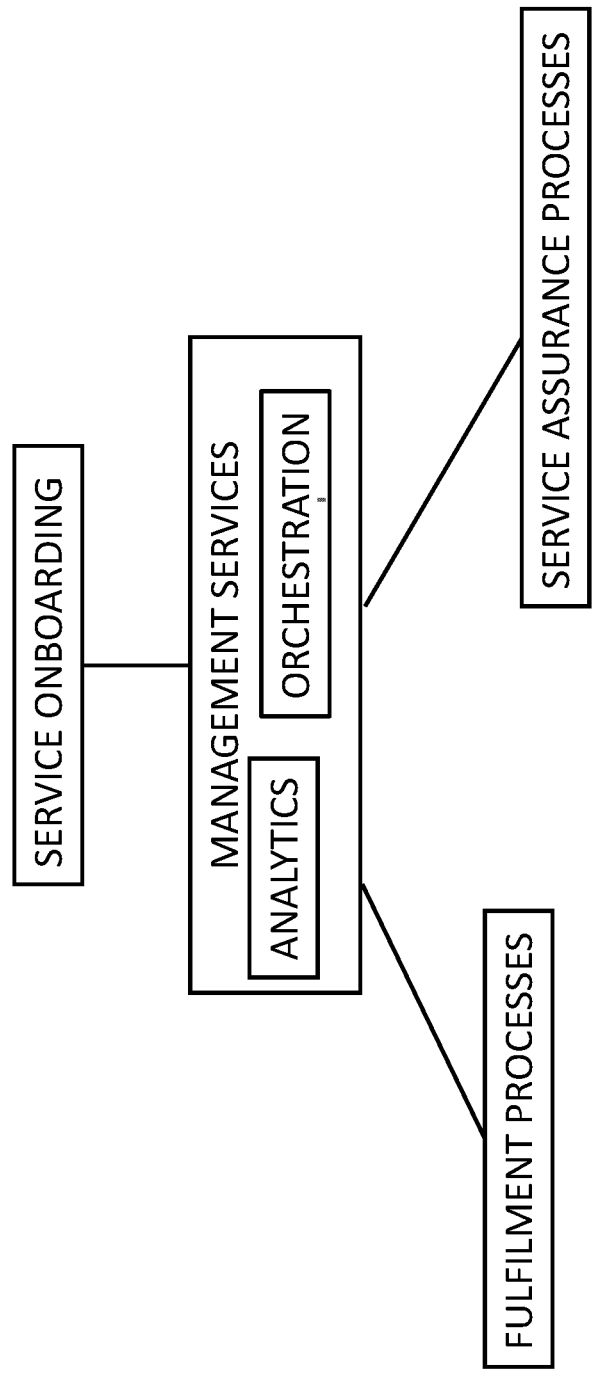
FIG. 3 shows schematically the management processes supporting the life cycle management of a communication service.

In this regard, reference is made to FIG. 3, which shows schematically the management processes supporting the life cycle management of a communication service. The processes include a service onboarding process, a service fulfilment process, a service assurance process, and management services. The management services may include one or more of integration, orchestration, data collection, analytics, data services and intelligence processes. The service fulfilment processes may include service instantiation, service activation, service configuration, service deactivation, service inventory/topology and service decommissioning. The service assurance processes may include service assurance set-up, service quality management and service assurance tear down.

Before a service can be instantiated, one or more preliminary processes are needed. This may allow the one or more different parties that contribute to the service to agree on one or more details about the service. For example, considering a network slice instance as an example implementation of an end-to-end communication service, the preparation for a network slice instance comprises the design and onboarding of the network slice.

Figure 4:
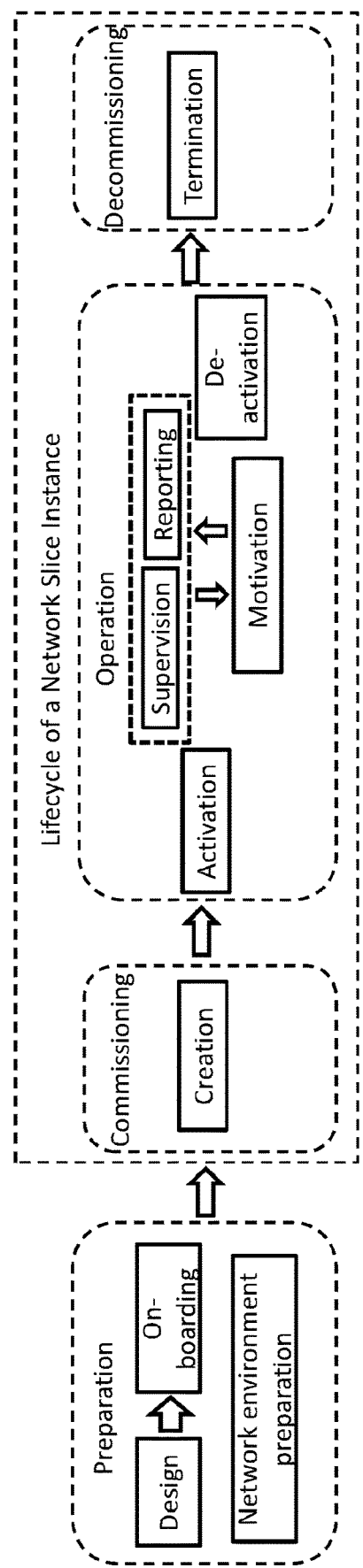
FIG. 4 schematically shows an overview of the network slice life-cycle management operations.

Network slice Life-Cycle Management (LCM) refers to the management operations required to create and decommission an NSI and to manage and optimize it at runtime. FIG. 4 depicts an example overview of the network slice LCM operations.

A first, preparation, stage includes design, on-boarding, and network environment preparation. The lifecycle of a NSI includes a commissioning phase (which includes the creation of the network slice), an operation phase (which includes activation and deactivation of the network slice as well as modification in response to supervision and reporting) and a decommissioning phase (which includes the termination of the network slice).

FIG. 3 thus schematically shows the different phases for provisioning a NSI (NSSI (network slice subnet instance) creation, NSSI activation; NSSI de-activation, NSSI modification, and NSSI termination.

In more detail, the preparation processes may be as follows:

Service design—the processes and deciding and agreeing on the characteristics of a service including performance characteristics, the operational policies for offering the service as well as the technical characteristics through the service is offered.

Service onboarding—the process of supporting the agreed service as a candidate service that can be deployed, e.g. providing support on service order platforms, and providing the technical descriptions (called service models) to the tools where the related technical resources are to be activated when needed. Service descriptors may be considered as the description of the features visible to the service consumers while service model includes the technical features about how the service shall be implemented, including the service descriptor features Service instantiation—the process of initiating a specific instance of the service, e.g., for a specific customer. A single designed and onboarded service may be instantiated multiple times e.g. by creating a template which is used each time a new instance is needed.

The onboarding of the service has to date, assumed that the service is designed beforehand and onboarded in a single shot processes, i.e. a service descriptor is provided, and the service is onboarded according to the service descriptor. Current specifications for the multi-vendor integration of service management tools focus only on service onboarding as the first step in the service lifecycle. The service order process is not currently considered even though it is an integral part of the end-to-end service realization process. Current standard specifications only refer to a single service descriptor without consideration of the following three different aspects:

the requirements specification which describe the expected requirements of given customer groups. This may be provided as an input into the service design process, the outcome of the service design process (the service offer descriptor), and the service instantiation requirements (the service order descriptor) which describe the characteristics of the service to be instantiated.

The current framework for service ordering forces a service consumer to rely on a single service provider at a time. In particular, the current framework does not facilitate a process where different service providers are able to make different offers, one of which can then be selected.

Some embodiments may allow for flexible service ordering. Some embodiments may enable the service to be flexibly onboarded and instantiated on one of a plurality of networks. This may be dependent on respective service offers from different service providers and/or the service consumer's requirements. Thus some embodiments may allow one of a plurality of service provider solutions or networks to be selected and used to support the requirements of a consumer. Some embodiments may allow a service consumer to choose one of a plurality of available services.

Figure 5:
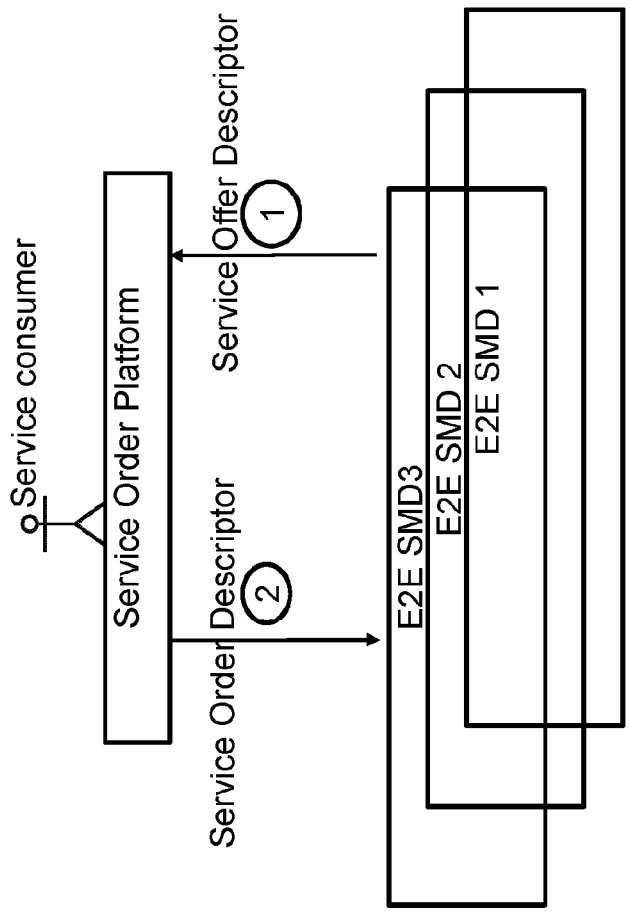
FIG. 5 schematically shows a system of some embodiments.

Reference is made to FIG. 5 which shows a multivendor interaction between a service design took and an End-2-End service management domain. Some embodiments may support the flexible selection of network resources for a given service order. To achieve this, a service order platform (SOP) or any other suitable entity may be provided. The SOP is able to interact with service management domains of multiple network providers or service providers to negotiate and execute the instantiation of service orders.

A service order interface allows interaction between the SOP and the SMD. This interface may be provided as a north bound interface (NBI) on the E2E SMD, or its related service catalogue, over which the service order is specified.

The SOP supports the ordering of services to be instantiated on a plurality of networks (and is correspondingly connected to a plurality of SMDs). In the example shown in FIG. 5, there are three SMDs, SMD 1, SMD 2 and SMD 3. This is by way of example only and in other embodiments there may be more or less than three SMDs.

Each SMD exposes a service offer descriptor to the SOP (over the service order interface). This is referenced 1 in FIG. 5. The service offer descriptor may be generated through a design process. The service offer descriptor describes the characteristics of the service offered by the SMD and its associated network (resources). The service offer descriptor may comprise one or more of the policies and conditions with which the service many be offered. The service offer descriptor represents the part of the description of the implementable service (herein called the service model) that is exposed to the service consumer to be selected as the desired service to be instantiated.

The SOP receives service requirements. This may be from a human service consumer or may be computer generated and provided by a computer or provided in any other suitable manner. The service requirements describe the consumer's desired service characteristics. In some embodiments, the requirements may comprise the acceptable and/or minimum conditions and constraints.

The SOP matches the consumer's requirements with the available service offer descriptors from the different SMDs to select the offer that best fulfils the service consumers' desired service characteristics and/or constraints. These may be regarded as defining an acceptable level or value. The level or value may be a minimum level or a maximum level depending on the characteristic. For example, the level or value may be for jitter and the maximum level or value may be 10 ms. This may mean that provided that the jitter is 10 ms or less, that would be an acceptable value for jitter. Another example, the level may be for reliability and the minimum value may be 99.0%. This may mean that provided that the reliability is 99.0% or better, that would be an acceptable value for reliability.

The matching may involve iterating over a plurality of configurations as provided for by the respective service offer descriptors.

When the offer is selected, the SOP generates a service order descriptor, which is the specific configuration of the selected service offer descriptor that best fulfills the consumers' desired service characteristics and/or constraints.

The SOP forwards the generated service order descriptor to the associated SMD for onboarding and instantiation. This is referenced 2 in FIG. 5.

Figure 6A:
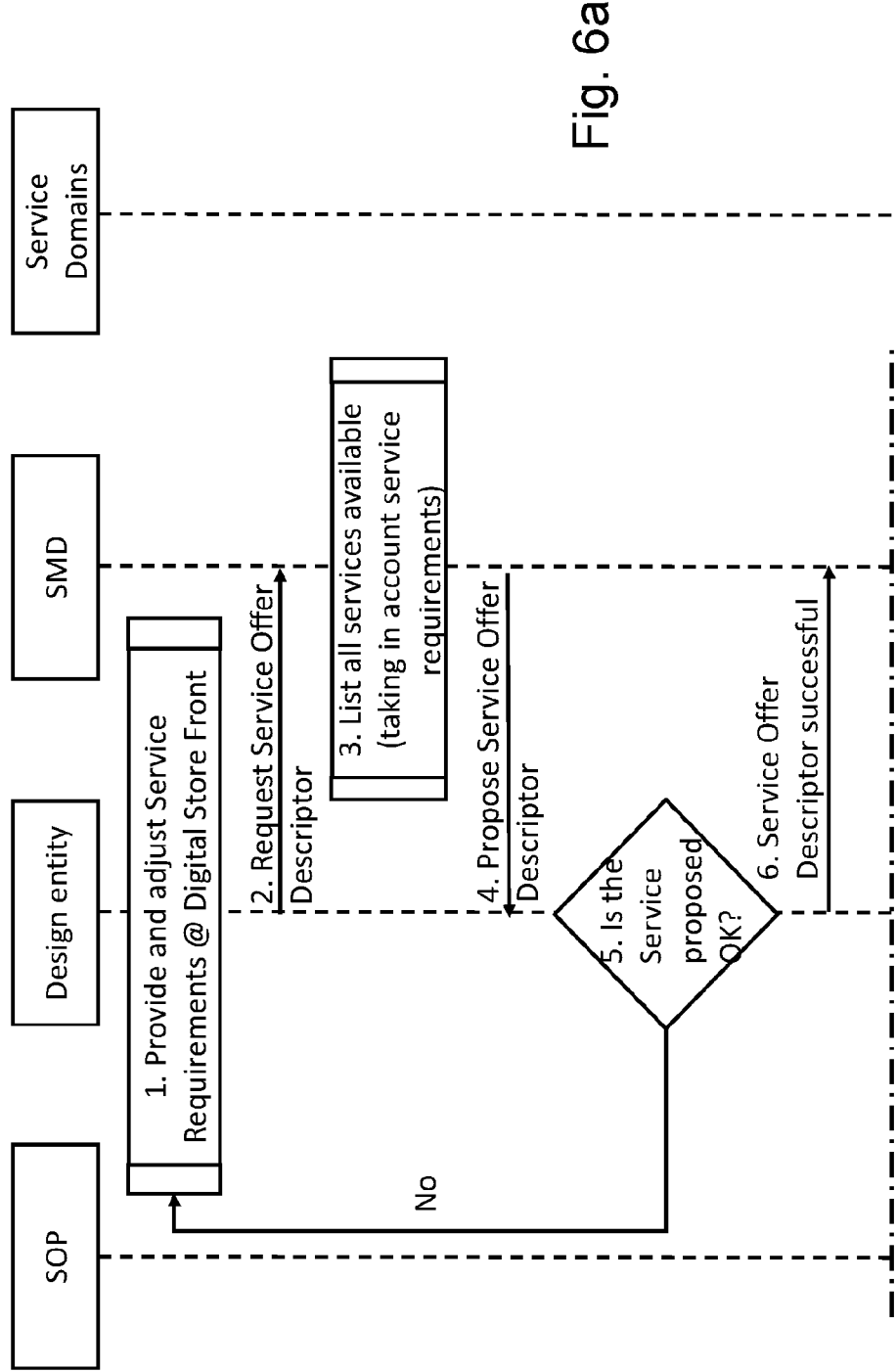
FIGS. 6a and 6b show an example of service ordering within the service preparation process.
Figure 6B:
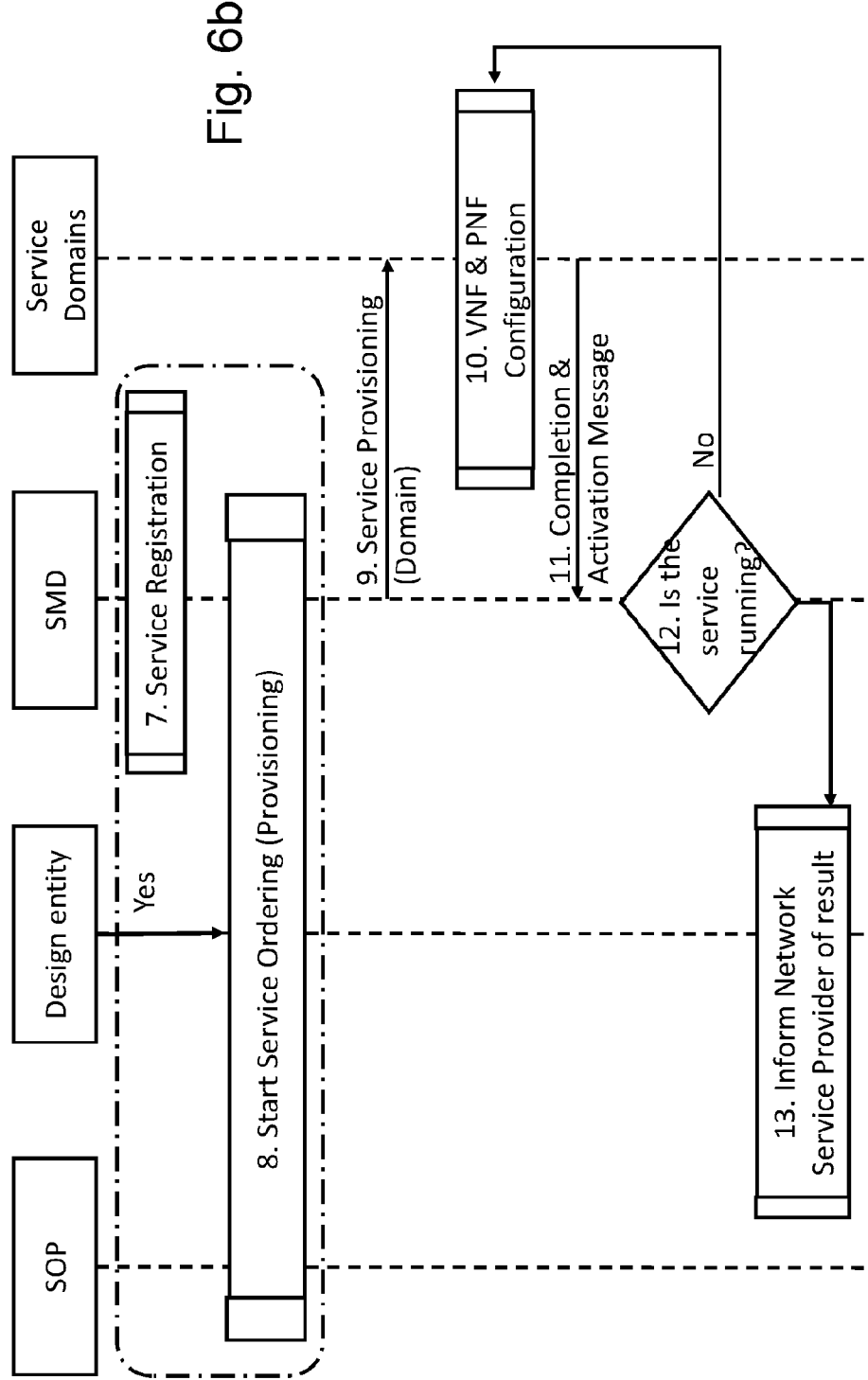

The service ordering within the service preparation process will be described in more detail with reference to FIGS. 6a and 6b. The service order process is the transition process between the service design and the service onboarding. In the service order process the SMD interacts with the service design entity to agree on the characteristics of the services that can be offered. This is described in steps 1 to 7 of FIGS. 6a and 6b. Steps 1 to 6 are shown in FIG. 6a and steps 7 to 13 are shown in FIG. 6b.

In step 1, the design entity provides the service requirements. This may be with the aim of designing a service offer descriptor.

In step 2, the design entity sends a request with a service offer descriptor. This is requested from the SMD.

In step 3, the SMD may list all services which are potentially available. This takes into account the service requirements in the service offer descriptor.

In step 4, the SMD sends a proposed service offer descriptor to the design entity.

In step 5, the design entity determines if the proposed service offer descriptor is acceptable. If not the next step is again step 1 where an adjustment can be made to the service requirements and the process is repeated.

If the service offer descriptor is acceptable, the next step is step 6. The design entity sends a message to the SMD associated with the acceptable service offer descriptor indicating that the service offer descriptor is accepted. In response, in step 7, the service offer descriptor is registered by the successful SMD.

The end result of this interaction is a service offer descriptor that is registered at the SMD. This service offer descriptor may be offered to the SOP. It should be appreciated that this process may be repeated with to provide different service offer descriptors from the same SMD and/or different service offer descriptors from different SMDs. Different design entities may be associated with different SMDs. In other embodiments, one design entity may be associated more than one different SMD.

In step 8, the SOP has selected one of the service offer descriptors from a plurality of service offer descriptors provided by the different SMDs to provide a service order descriptor. The service ordering is started.

Based on the service order descriptor, the associated SMD then triggers the instantiation as in shown steps 9-13 of FIG. 6b. The remaining operations are assumed to be managed by the service domains by reserving and assigning the required infrastructure resources to support the service. In the end, the SMD expects to receive a successful message, so it advertises the availability and readiness of the service to be consumed.

In step 9, the SMD sends a service provisioning message to the service domain or domains.

In step 10, the service domain(s) provides the VNF (virtual network function), PNF (physical network function) and/or CNF (container network function) configuration.

In step 11, the service domain(s) provide a completion and activation message to the SMD.

In step 12, it is determined by the SMD if the service is running. If not, then the next step is step 10 again where the VNF and/or PNF configuration is updated.

If so, the next step is step 13 in which the SOP informs the network service provider of the availability of the service.

Figure 7:
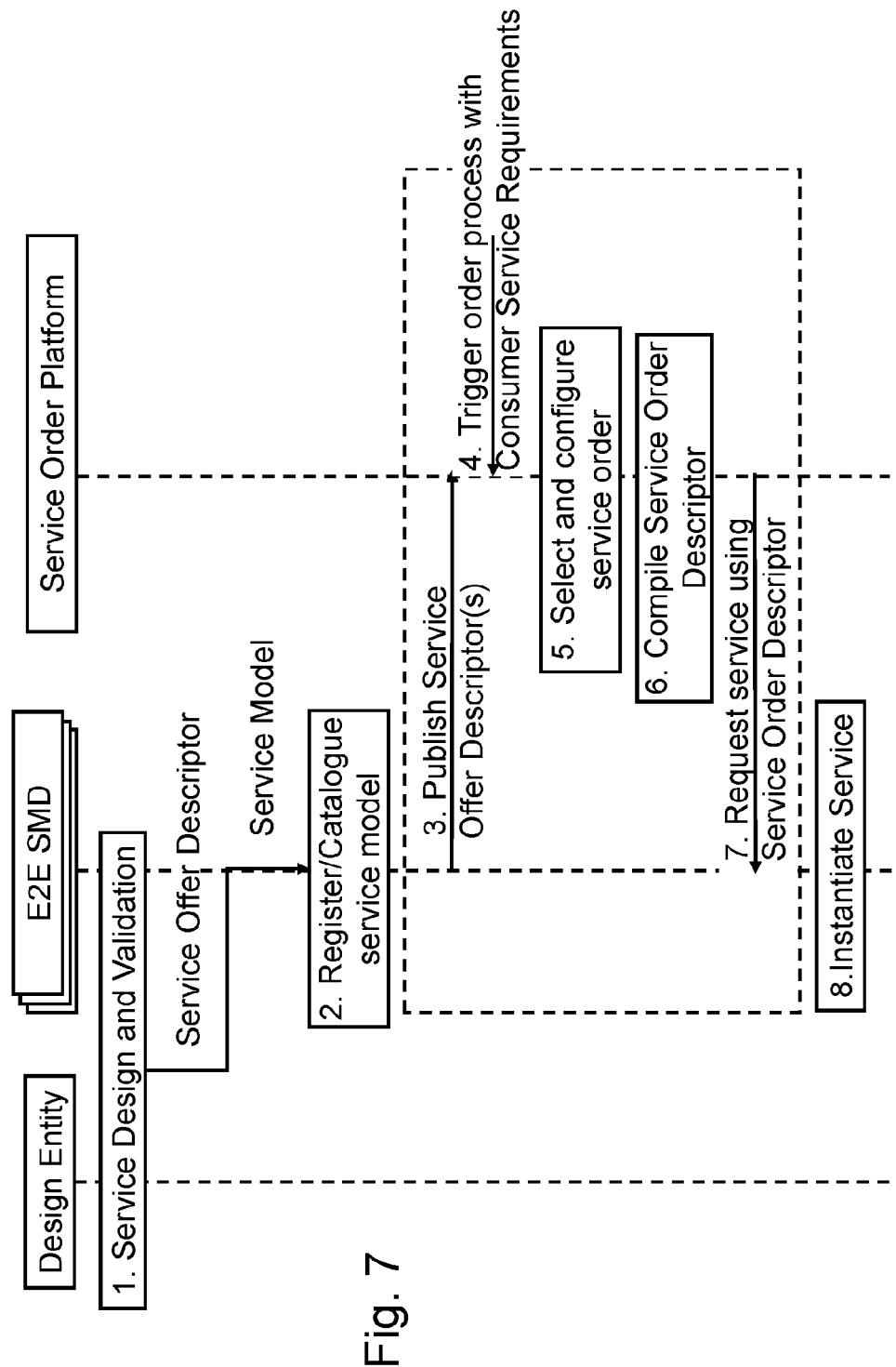
FIG. 7 shows in more detail a service ordering process.

The details of the service order process are described next with reference to FIG. 7.

In step 1, it is assumed that a service design and validation process has been accomplished. This may be as in steps 1 to 6 of FIG. 6a.

In step 2, once step 1 has been concluded successfully, the service registration can start. (This corresponds to step 7 of FIG. 6b.) This is to store the data model with all service relationships in the service catalogue (end-to-end), so it can be used across all components which are part of the ordering process. The outcomes of the service design are the service offer descriptor and corresponding service model that are then registered by the respective SMD. Different service offer descriptor and corresponding service model are registered with different SMDs.

The service offer descriptor describes options for the features of the service that is supported by the respective SMD and options for the policies with which that SMD may offer the service. Both the features and policies of the service offer descriptor may be configured to define the exact service that shall be instantiated.

In step 3, to allow for services to be ordered, each SMD publishes its service offer descriptor to the SOP. A SMD may support multiple types of services each of which may be configurable in various ways. Correspondingly, ta SMD may publish multiple service offer descriptors to the same SOP. A SMD may publish its service offer descriptor(s) to a plurality of SOPs. The SOP may take service offer descriptors (describing the service and offer policies) from a plurality of network providers or service providers or service management domains (SMDs) to allow services to be instantiated on any one of those networks/SMDs. In that respect the SOP may be considered analogous to a marketplace where a service may be purchased from any one or more service and/or network providers depending on the requirements of the service consumer.

In step 4, to start the service order process, the service order is triggered on the SOP by initiating a service order with the expected requirements of the consumer that are contained in a consumer service requirements specification.

The consumer service requirements specification may include an indication of the importance of the different features. An example indication may be a weight on a specified scale. By way of example, the scale may say [1,x] added to each feature to indicate how important that features are with say 1 being the highest priority feature and x the lowest priority feature (or vice versa). X can be any suitable value such as 2 or more. By way of example only, the consumer service requirements specification may for example indicate latency specification as priority 1, price as priority 2 and throughput as priority 4, which would indicate that any selection for an appropriate service offer should prioritize latency ahead of everything else including price.

In step 5, the SOP considers the features of the consumer service requirements specification and matches them with the features of the available service offer descriptors from the plurality of networks/SMDs to identify the service offer descriptor which most closely matches the consumer service requirements specification. This service offer descriptor, that most closely matches the consumer service requirements specification, is then configured for the final order. In the matching process, the SOP may consider the multiple variations of each service offer descriptor that are possible when that service offer descriptor is configured through one, some or all its allowed configurations.

In step 6, for the selected service offer descriptor and its specific configuration, the SOP compiles its features into the service order descriptor, which is the single-shot statement of consumer's desired service characteristics.

In step 7, the SOP then orders the services by providing the service order descriptor to the corresponding network or service provider's SMD.

In step 8, given a service offer descriptor, the SMD triggers and executes the service instantiation processes. By way of example only, this may be as described in ETSI GS ZSM 008.

In some embodiments, the SOP may not support prioritization and the consumer service requirements are not prioritized. In this case, the selection of the service offer descriptor considers how closely the features of the consumer service requirements specification and values thereof match the feature and values of the service offer descriptor. There where there are multiple matches, a service offer descriptor may be randomly selected.

To support the order process, the SMDs and the SOP expose an interface. This interface is referred to as a service order interface (SOI) in this document. The service order interface may have the characteristics and features to support one or more of the following requirements:

the SOP has an SOI to each of the SMDs to which services may be ordered, i.e. the SOP exposes one or more SOIs;

each SMD exposes one SOI to the SOP but may expose a plurality of SOIs one to each SOP that is allowed to order for services on that SMD;

each SMD publishes its service offer descriptor to an SOP by sending the service offer descriptor over the SOI; and to order the service the SOP sends its compiled service order descriptor to the SMD on which it requires the service to be instantiated.

The service offer descriptor is the input to the service order process and is the list of service characteristics, features and policies that can and are confirmed to be supported by the network. The service order descriptor is agreed a priori between the service provider and the network provider to contain the service description to be exposed to the service consumers. This description is used by the service consumers to select the specific services to be instantiated.

The service offer descriptor includes a set of policies that are supported for the planned service with candidate policy values from which the policies desired by the consumer may be selected. Policy values may be binary (yes/no options) or non-binary categorical values. One or more values may be directly or indirectly linked to the pricing of the service.

An example policy may for example be "handover is supported" with the possible values being:

"yes"—indicating that handover can be supported, e.g., for a fleet management service;

"no"—indicating that handover is not supported but may be desired in some cases, e.g., for an agricultural farm automation management service for which tractors or animals may once in a while wander outside the designated radio cell but would remain functional even if they lost coverage for that short time; and "not applicable"—indicating that handover is not needed at all, e.g. for sensor monitoring in building management service.

An example of a service offer descriptor for Massive Machine Type Communication MMTC services is shown in the table of FIG. 8. MMTC services which are used to support high numbers of low end and low throughput devices e.g. for monitoring applications.

The table of FIG. 9 illustrates the service offer descriptor for ultra-reliability and low latency communication (URLLC) services. URLLC services are the kind to support sensitive communication services with need for high reliability and low latency e.g. for applications in industrial communications or for driver assistance and self-driving cars.

The service offer descriptor specifies value ranges for the following features:

end-to-end latency; jitter; survival time; availability; reliability; end-user data rate; payload; traffic density; connection density; service area size; and policies such as a pricing policy.

As can be seen from the tables of FIGS. 8 and 9, different range values are specified for some of the features. For example, the end to end latency values are higher for MMTC as compared to URLCC. Some features may be associated with the same value ranges, for example survival time is the same in both cases.

It should be appreciated that the features and the value ranges of the service offer descriptors shown in the tables of FIGS. 8 and 9 are by way of example only. At least some of the features may be quality of service-related features.

Before ordering, the SOP configures a selected service offer descriptor according to the service consumer requirements specification. The service consumer requirements specification is a listing of the desired features required by the service consumer. The service consumer requirements specification may contain only a subset of the features in the service offer descriptor with the desired values for those features.

An example service consumer requirements specification is shown in the table of FIG. 10. The table of FIG. 10 which shows the potential requirements for a service to monitor animals on a large farm.

The service offer descriptor requires an end-to-end latency<100 ms, jitter<50 ms, availability>99.5%, reliability>99.0%, end-user data rate≥0.2-1.0 Mbps, a service area size $1.0 \times 1.0 \text{ km}^2$ and a handover policy value—not required.

A similar requirement may be provided for a URLLC service (e.g. a service to monitor the movement of trains). These other services may require more or less features and/or different features. The values may be different depending on the service being supported.

Given the service consumer requirements specification, the SOP compares the service consumer requirements specification with the available service offer descriptors to identify an appropriate service offer. In other words, the SOP compares line by line the entries in the service consumer requirements specification with those in each service offer descriptor. For the service consumer requirements specification in the table of FIG. 10, the entries are more closely matched with the entry values in the service offer descriptors for MMTC services (i.e. the table in FIG. 8). The table of FIG. 8 is thus selected for configuration of the animal-monitoring service.

Configuration of the service offer descriptor implies selecting, for specific attributes of the service offer descriptor the values that are desired/appropriate for the service to be instantiated. To configure each attribute of the service offer descriptor, the SOP evaluates different values of the service offer descriptor that fulfil the conditions in the service consumer requirements specification to see what the cost implications may be. It may for example then select the value that maximizes the given condition but minimizes the cost implications.

Consider an example where a service monitors the animals on the farm. Referring to the table of FIG. 8, an end-to-end latency of 50 ms, a jitter of 20 ms, a survival time of 2 ms, an availability of 99%, a reliability of 99.5%, an end-user data rate≥0.1 Mbps, a payload around 1 Bytes, a traffic density of 0.1 Gbps/km$^2$, a connection density of 5000,000/Km$^2$ and a service area of 1×1 km$^2$ may be required.

Consider another example where a service monitors the movement of trains which would require very strict latency and high availability/reliability. Referring to the table of FIG. 9, an end-to-end latency of 0.5 ms, a jitter of 0.5 ms, a survival time of 10 ms, an availability of 99.9%, a reliability of 99.9%, an end-user data rate≥0.2 Mbps, a payload around 20 Bytes, a traffic density of 0.5 Gbps/km$^2$, a connection density of 5000 Km$^2$ and a service area of 0.1×10 km$^2$ may be required.

The final result of the configuration is the service order descriptor, which is a is a table of attributes to values. This lists the service characteristics, features and policies that should be instantiated by the network for the service consumer. The attributes of the service order descriptor may be the same as those for the service offer descriptor, but a specific value is set for each attribute to indicate the attribute needed by the service consumer. This also applies to the policy values which are also reduced to only indicate those needed by the service consumer.

The table of FIG. 11 illustrates an example service order descriptor for the animal-monitoring service on a farm. This is a large farm with thousands of animals. This provides a service offer descriptor of an end-to-end latency of 50 ms, a jitter of 20 ms, a survival time of 2 ms, an availability of 99%, a reliability of 99.5%, an end-user data rate 0.1 Mbps, a payload around 1 Bytes, a traffic density of 0.1 Gbps/km$^2$, a connection density of 5000 000 Km$^2$ and a service area of 1×1 km$^2$. The values of a pricing policy and a second policy are also defined.

The table of FIG. 12 illustrates an example service order descriptor and for the train-monitoring service. This provides a service offer descriptor of an end-to-end latency of 0.5 ms, a jitter of 0.5 ms, a survival time of 10 ms, an availability of 99.9%, a reliability of 99.9%, an end-user data rate 0.2 Mbps, a payload around 20 Bytes, a traffic density of 0.5 Gbps/km$^2$, a connection density of 5000 Km$^2$ and a service area of 0.1×10 km. The values of a pricing policy and a second policy are also defined.

Some embodiments may enable service ordering across network and/or service providers by enabling different E2E service management domain tools to expose their services to single service ordering platform where one of them may be selected for instantiating a service.

Some embodiments may enable the automated selection and configuration of a service according to the interests of the service consumer and the capabilities that are supported by one of multiple service providers It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

A network slice has been described as one example of a service which can be provided. It should be appreciated that other embodiments may be used with other examples of services.

Figure 13:
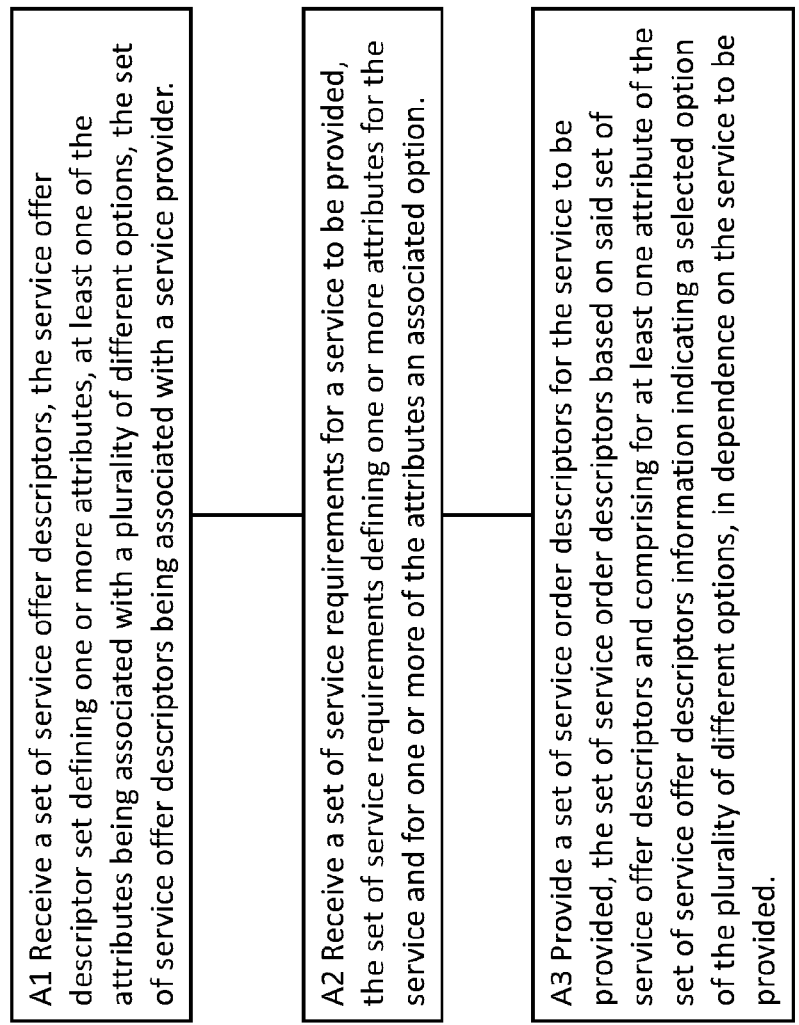
FIG. 13 shows a first method of some embodiments.

Reference is made to FIG. 13 which shows a method. The method may be performed by an apparatus. This apparatus may be as described in relation to FIG. 2. The apparatus may be provided by or in a SOP entity.

The method may comprise in step A1 receiving a set of service offer descriptors. The service offer descriptor set may define one or more attributes. At least one of the attributes is associated with a plurality of different options. The set of service offer descriptors is associated with a service provider.

The method may comprise in step A2, receiving a set of service requirements for a service to be provided. The set of service requirements defines one or more attributes for the service and for one or more of the attributes an associated option.

The method may comprise in step A3 providing a set of service order descriptors for the service to be provided. The set of service order descriptors is based on said set of service offer descriptors and comprising for at least one attribute of the set of service offer descriptors information indicating a selected option of the plurality of different options, in dependence on the service to be provided.

Figure 14:
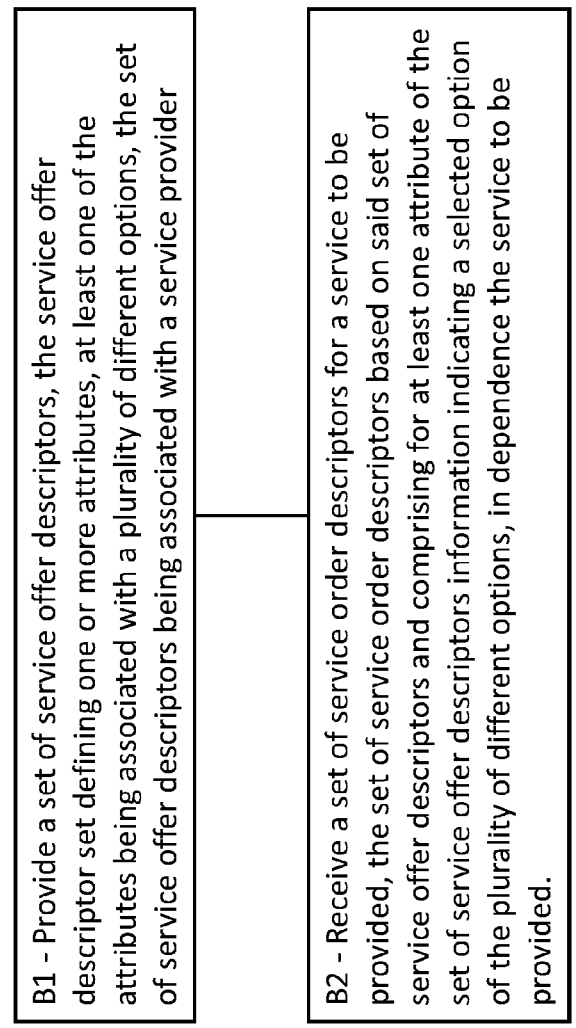
FIG. 14 shows a second method of some embodiments.

Reference is made to FIG. 14 which shows a method. The method may be performed by an apparatus. This apparatus may be as described in relation to FIG. 2. The apparatus may be provided by or in a SMD entity.

The method may comprise in step B1 providing a set of service offer descriptors. The service offer descriptor set may define one or more attributes. At least one of the attributes is associated with a plurality of different options. The set of service offer descriptors are associated with a service provider.

The method may comprise in step B2, receiving a set of service order descriptors for a service to be provided. The set of service order descriptors is based on the set of service offer descriptors and comprises for at least one attribute of the set of service offer descriptors information indicating a selected option of the plurality of different options, in dependence the service to be provided.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 12 and 13, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively, or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
(i) a combination of analogue and/or digital hardware circuit(s) with software/firmware and
(ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one memory storing instructions that, when executed by the at least one processor, cause the apparatus at least to:
receive a set of service offer descriptors, the service offer descriptor set defining one or more attributes, at least one of the attributes being associated with a plurality of different options, the set of service offer descriptors being associated with a service provider, wherein at least two of the sets of service offer descriptors are associated with different service providers;
receive a set of service requirements for a service to be provided, said set of service requirements defining one or more attributes for the service and for one or more of the attributes an associated option; and
provide a set of service order descriptors for the service to be provided, said set of service order descriptors based on said set of service offer descriptors and comprising for at least one attribute of the set of service offer descriptors information indicating a selected option of the plurality of different options, in dependence on the service to be provided.

2. The apparatus as claimed in claim 1, wherein the at least one memory and the instructions, when executed by the at least one processor, further cause the apparatus at least to receive a plurality of sets of service offer descriptors, each set of service offer descriptors being associated with a service provider, and determine which one of the plurality of sets of service offer descriptors is selected in dependence on the received set of service requirements.

3. The apparatus as claimed in claim 1, wherein the one or more attributes of the set of service offer descriptors define one or more quality of service attributes for a service provided by the respective service provider.

4. The apparatus as claimed in claim 2, wherein the at least one memory and the instructions, when executed by the at least one processor, further cause the apparatus at least to select for each attribute of the selected set of service offer descriptors which is associated with a plurality of different options, one of said options, the selected option being dependent on the received set of service requirements to provide the set of service order descriptors.

5. The apparatus as claimed in claim 1, wherein the at least one memory and the instructions, when executed by the at least one processor, further cause the apparatus at least to cause a request, for the service to be provided, to be sent to the service provider associated with the set of service offer descriptors.

6. The apparatus as claimed in claim 5, wherein the request comprises information relating to the set of service order descriptors.

7. The apparatus as claimed in claim 2, wherein the at least one memory and the instructions, when executed by the at least one processor, further cause the apparatus at least to iterate over each a plurality of different configurations provided by different options associated with respective attributes of a respective set of service offer descriptors when determining the selected set of service offer descriptors.

8. The apparatus as claimed in claim 1, wherein the set of service requirements defines for one or more attributes an acceptable value.

9. The apparatus as claimed in claim 1, wherein the set of service requirements comprises information indicating a relative importance of one or more of the attributes.

10. An apparatus comprising:
at least one processor; and at least one memory storing instructions that, when executed by the at least one processor, cause the apparatus at least to:
provide a set of service offer descriptors, the service offer descriptor set defining one or more attributes, at least one of the attributes being associated with a plurality of different options, the set of service offer descriptors being associated with a service provider, wherein at least two of the sets of service offer descriptors are associated with different service providers; and
receive a set of service order descriptors for a service to be provided, said set of service order descriptors based on said set of service offer descriptors and comprising for at least one attribute of the set of service offer descriptors information indicating a selected option of the plurality of different options, in dependence on the service to be provided.

11. The apparatus as claimed in claim 10, wherein the one or more attributes of the set of service offer descriptors define one or more quality of service attributes for a service provided by the service provider.

12. A method comprising:
receiving a set of service offer descriptors, the service offer descriptor set defining one or more attributes, at least one of the attributes being associated with a plurality of different options, the set of service offer descriptors being associated with a service provider, wherein at least two of the sets of service offer descriptors are associated with different service providers;
receiving a set of service requirements for a service to be provided, said set of service requirements defining one or more attributes for the service and for one or more of the attributes an associated option; and
provide a set of service order descriptors for the service to be provided, said set of service order descriptors based on said set of service offer descriptors and comprising for at least one attribute of the set of service offer descriptors information indicating a selected option of the plurality of different options, in dependence on the service to be provided.

* * * * *